(12) United States Patent
Melcher et al.

(10) Patent No.: US 7,378,641 B2
(45) Date of Patent: May 27, 2008

(54) DEVICE AND METHOD FOR IDENTIFYING AN OBJECT IN OR ON A CLOSABLE OPENING

(75) Inventors: Rolf Melcher, Karlsruhe (DE); Frank Rottmann, Dortmund (DE); Gerd Reime, Bühl (DE); Andreas Rodewald, Herrenberg (DE); Juergen Setzer, Illingen (DE); Michael Dietz, Ehningen (DE); Peter Langer, Karlsruhe (DE)

(73) Assignees: Daimler Chrysler AG, Stuttgart (DE); Mechaless Systems GmbH, Karlsruhe (DE)

( * ) Notice: Subject to any disclaimer, the term of this patent is extended or adjusted under 35 U.S.C. 154(b) by 100 days.

(21) Appl. No.: 11/568,239

(22) PCT Filed: May 14, 2005

(86) PCT No.: PCT/EP2005/005294

§ 371 (c)(1),
(2), (4) Date: Oct. 24, 2006

(87) PCT Pub. No.: WO2005/114263

PCT Pub. Date: Dec. 1, 2005

(65) Prior Publication Data

US 2007/0221824 A1 Sep. 27, 2007

(30) Foreign Application Priority Data

May 19, 2004 (DE) ............ 10 2004 025 345

(51) Int. Cl.
*G08B 13/18* (2006.01)
*G01V 8/24* (2006.01)

(52) U.S. Cl. ............... 250/221; 340/555; 340/556; 49/25; 49/26; 49/28

(58) Field of Classification Search ........... 250/221, 250/222.1, 216, 227.11, 578.1; 340/555, 340/556, 557, 550, 552; 49/25, 26, 28
See application file for complete search history.

(56) References Cited

U.S. PATENT DOCUMENTS 4,571,498 A * 2/1986 Hagan et al. .......... 250/559.21

(Continued)

FOREIGN PATENT DOCUMENTS

DE 3620227 8/1987

(Continued)

*Primary Examiner*—Stephen Yam
(74) *Attorney, Agent, or Firm*—Stites & Harbison, PLLC; David W. Nagle, Jr.

(57) ABSTRACT

The invention relates to a device and a method for identifying an object O in an opening that can be closed by means of a mobile element (12). Light is fed into at least one fiber-optic light guide (33, 34) from a light source (1, 2), and variations in the received light are detected by means of at least one receiver (Ea, Eb), the fiber-optic light guide being arranged at least partially along the edge of the opening (11). A first fiber-optic light guide sends light transversally to the length thereof, said light being then received by a second fiber-optic light guide transversally to the length thereof. The second fiber-optic light guide (34) is connected to the receiver (Eb). The fiber-optic light guides are arranged on the edge of the opening (11) in such a way that a light field (F) at least partially bridging the opening is produced. At least one light source (1, 2) and at least one receiver (Ea, Eb) are respectively associated with each fiber-optic light guide (33, 34), and a clock circuit is used to alternately feed the light received by the respective receiver into the fiber-optic light guides. Comparison means are used to compare the signals on the receivers in order to identify the object.

28 Claims, 7 Drawing Sheets

U.S. PATENT DOCUMENTS

| | | | |
|---|---|---|---|
| 4,794,248 A * | 12/1988 | Gray ......................... 250/221 |
| 6,043,620 A | 3/2000 | Koestler |
| 6,186,586 B1 | 2/2001 | Lindinger |
| 6,463,698 B1 | 10/2002 | Hofmann |
| 6,495,832 B1 | 12/2002 | Kirby |
| 6,710,562 B1 | 3/2004 | Kalb et al. |
| 6,975,390 B2 | 12/2005 | Mindl et al. |

FOREIGN PATENT DOCUMENTS

| | | |
|---|---|---|
| DE | 199 39 651 | 6/2001 |
| DE | 101 20 940 | 10/2002 |
| DE | 102 05 810 | 2/2003 |
| DE | 102 38 810 | 3/2004 |
| DE | 10 2004 011 780 | 10/2005 |
| EP | 0 706 648 | 9/1997 |
| WO | WO 00/77447 A1 * | 12/2000 |
| WO | WO 03/009476 | 1/2003 |

* cited by examiner

DEVICE AND METHOD FOR IDENTIFYING AN OBJECT IN OR ON A CLOSABLE OPENING

REFERENCE TO RELATED APPLICATIONS

The present application claims the priority of the German patent application 10 2004 025 345, filed on May 19, 2004, the disclosure content of which is also expressly made the subject of the present application.

1. Field of the Invention

The invention relates to a device and a method for identifying an object in or on a closable opening according to the preamble of claims 1 and 17.

2. Prior Art

As soon as a movable part in a guide moves toward another part, there is basically the risk that an object located in between will be jammed in. Examples of this are found not only, but also, in the vehicle sector when, for example, a window closer or a sliding roof closes, in particular when this closing takes place automatically by means of a motor drive, or when a vehicle opening such as a door or a boot lid is closed.

Problems of this type were generally solved up to now in that the relevant space region is monitored according to the light barrier principle. If an object is located between the optical transmitter, such as for example an LED, and the optical receiver, such as, for example a photodiode, light is absorbed and the total quantity of light at the receiver is reduced. The evaluation electronics identify with the aid of this change in the light quantity received, that an object is present and relays this information to the higher-order processing unit. If it is desired to monitor the passage of objects through an area in the space, a plurality of such light barriers may be arranged next to one another.

Alternatively, the light expansion can be concentrated on the area to be monitored by means of a suitable transmitting and receiving optical system, such as is known from WO 03/009476 A1. It is thereby possible to illuminate the region to be monitored in a planiform manner with only one light source and only one receiver. If necessary, the sensitivity region in the direction perpendicular to this surface can be kept narrow, so that false triggerings by objects outside the passage area are minimised.

According to the jamming protection regulations, such as are available, in particular for sliding roofs, requirements are set for the protection of occupants by legislation for automatic closing functions, such as, for example, automatic closing or remote closing, it not being possible to meet these requirements to an adequate extent/in conformity with the law with conventional jamming protection solutions, for example in the form of an indirect jamming protection. This situation intensifies in the case of the "externally running sunroofs" which are also called panorama roofs. Owing to the design structure, these roofs present a much greater danger potential with regard to the risk of jamming in, which cannot currently be completely covered in conformity with the law with conventional measures. The synchronous running variations, caused by the design, of the externally running sun roofs and the possible large spread of the mechanical tolerances lead conventional jamming protection systems to the limit of detection possibility.

Light guides have already been used in the area of sliding roofs for jamming protection. In this regard, DE 102 05 810 A1, on which the preamble of claim 1 is based, suggests the use of a light guide, which is deformed under the action of an external pressure, so the intensity and/or the frequency and/or the running time of a light fed into the light guide is influenced. Owing to this change, it is concluded that jamming in has taken place and the drive of the sliding roof is correspondingly actuated. The optic-fibre light guide is arranged along the frame of the opening and can have a reflective coating at one end.

An arrangement of at least two light-emitting diodes is known from EP 0 706 648 B1, which act in an alternating manner on a photo receiver. The light controlled with respect to the amplitude of at least one light path acts together with the light of a further light source on the photo receiver in such a way that a receiving signal is produced without clocked signal fractions. The receiving signal of the photo receiver is supplied to a synchronous demodulator which in turn separates the receiving signal into the two signal components according to the light sources. The two signal components are compared with one another after low-pass filtering in a comparator. If signal differences occur, these are adjusted to zero by means of output control of at least one of the light sources, in order to thus achieve extraneous light compensation, in particular.

In the vehicle area, there is the added difficulty, however, that the receivers are so far apart from one another, under some circumstances, that they are subjected to significant temperature differences which can only be managed with difficulty even with reference values.

DISCLOSURE OF THE INVENTION

Proceeding from this prior art, the present invention is based on providing a device and a method for identifying an object in a closable opening, which operates reliably without contact.

This object is achieved by a device with the features of claim 1 and by a method with the features of claim 17.

Arranged at the edge of the opening are light guides, into which light is fed, which is radiated transversely to the longitudinal extent of the light guide from one light guide and is captured by the other light guide. A light field is thus formed, which bridges the opening. The two light guides are used alternately as emitting light guides and receiving light guides, so a bidirectional light field is produced. An object which is present in this bidirectional light field is identified by a comparative measurement between the signals received at the respective receivers. Owing to the structure of the light field, a favourable solution is provided, as basically only a few receiving and transmitting elements have to be used in connection with the light guides. The comparative measurements allow reference values to be basically dispensed with. Nevertheless, by corresponding evaluation of the values determined, both dynamic changes and an object statically located in the light field can be detected. The latter especially is often a risk in the previous systems, as it has to be identified, for example, in the case of a window or sliding roof whether a hand has been located for a relatively long time in the opened aperture.

For effective protection of the occupants with respect to potential jamming risks and for protection with respect to possible product liability claims, an optical light field is produced, for example in a sliding roof in the roof liner aperture, which reliably detects penetration and discontinues the automatic closure according to the legal requirement, so a jamming situation is avoided.

The optical layers, generally light guides, can be concealed by the roof liner and are therefore not visible to the customer, if this is not desired. The jamming protection can also be expanded to the control of blinds. To increase the reliability of the system and to suppress false triggerings, a bidirectional light field is therefore used, preferably in the multiplex method, with which possible false interpretations, owing, for example, to reflections as a result of the sliding roof cover or, in general, of the movable part, can be eliminated. At the same time, the action of extraneous light can be better differentiated by this arrangement.

The light guides can be economically arranged in the surface cover of the entire opening region, the light guide preferably being changed mechanically such that at many predefined locations light exits in a targeted manner and at a defined angle and the desired light distribution of the light field is produced over the opening. The light guides are used in an alternating manner as transmitters and receivers. The mechanical change of the light guide brings about an elimination of the total reflection and therefore the output of light. Each output location acts like a light source with a known radiation angle. The number of output points, their position and the numerical aperture can be varied in a targeted manner and determine the light distribution of the light field.

The signals present at the various receivers are preferably multiplied and/or divided, and/or their difference generated, in order to carry out dynamic and static measurements. The degree of efficiency of the protection device can be increased in that the light guides have a structure which outputs the light transverse to their longitudinal extent from the light guide. This structure can preferably be present, augmented or reinforced, in the proximity of the closing region, so an increased detection sensitivity exists there.

The light of the light guides can be emitted in the visible range in order to achieve ambient illumination thereby. A light ring would be produced, for example in the case of a sliding roof, in the liner aperture for the sliding roof. The compensated light information can be evaluated by means of the receivers, in particular in the case of extraneous light compensation. The position of the sun can thus be identified, for example, and the values determined thereby can be used for climate control or for control of a blind to reduce heating. All types of light identification are therefore possible, so, for example, the interior lighting can be switched off in daylight and this leads, in particular during stationary operation of the vehicle, to a reduction in the power requirement.

In the same context, the light information can also be used for monitoring, in that incident light is used as useful information for monitoring of the interior or monitoring of the side windows.

The jamming protection is so sensitive that automatic control in conformity with the law is also possible without a line of sight connection having to exist to the vehicle. Thus, the vehicle can initiate automatic closure of the blind during insolation and remote closing is possible even at large ranges. Even small signals, such as the signals from raindrops can be used as useful information, so rain closure becomes possible. In this case, the light field detects rain and causes automatic closing, for example of a sliding roof or window.

Advantageous configurations of the invention are provided in the corresponding sub-claims and the following description.

SHORT DESCRIPTION OF THE FIGURES

Embodiments of the invention are described in more detail with the aid of the accompanying drawings, in which.

Figure 3:
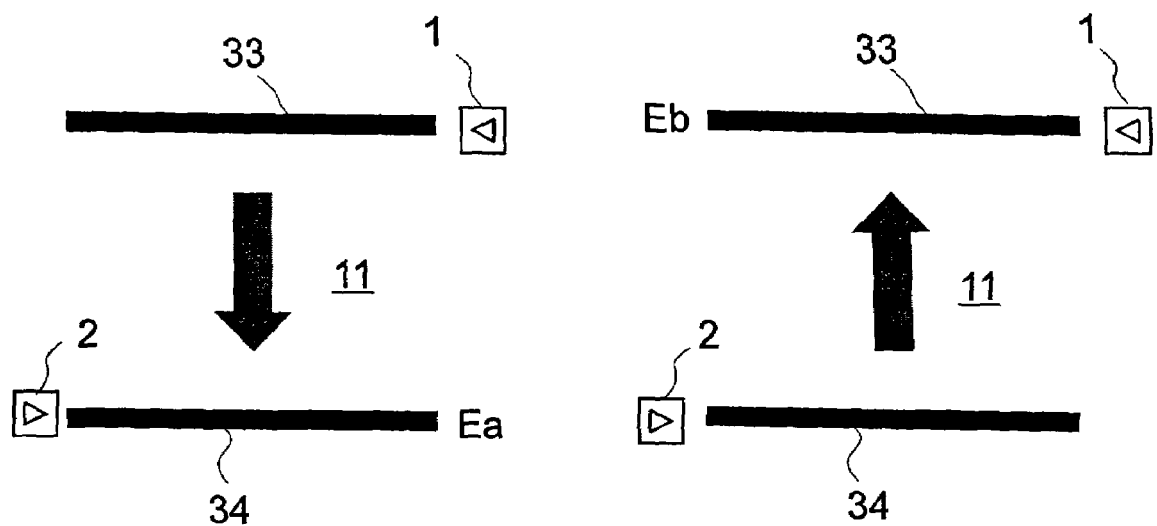
Figure 3:
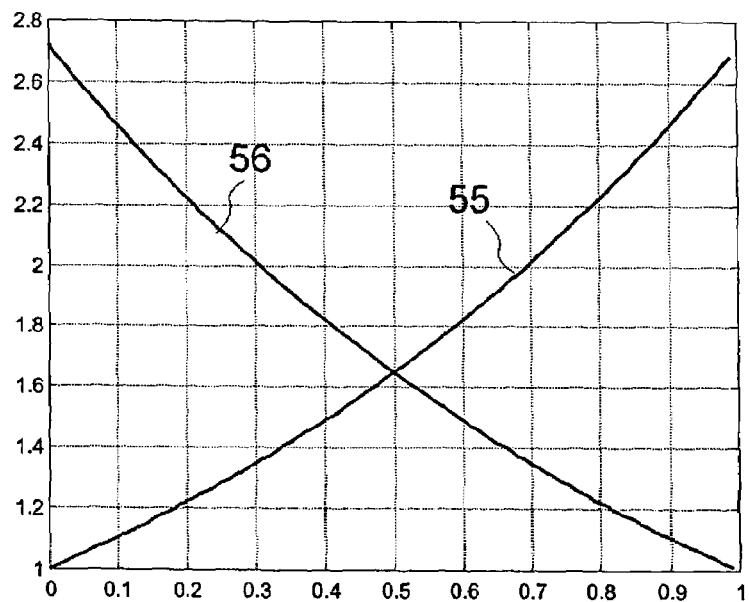
Figure 4:
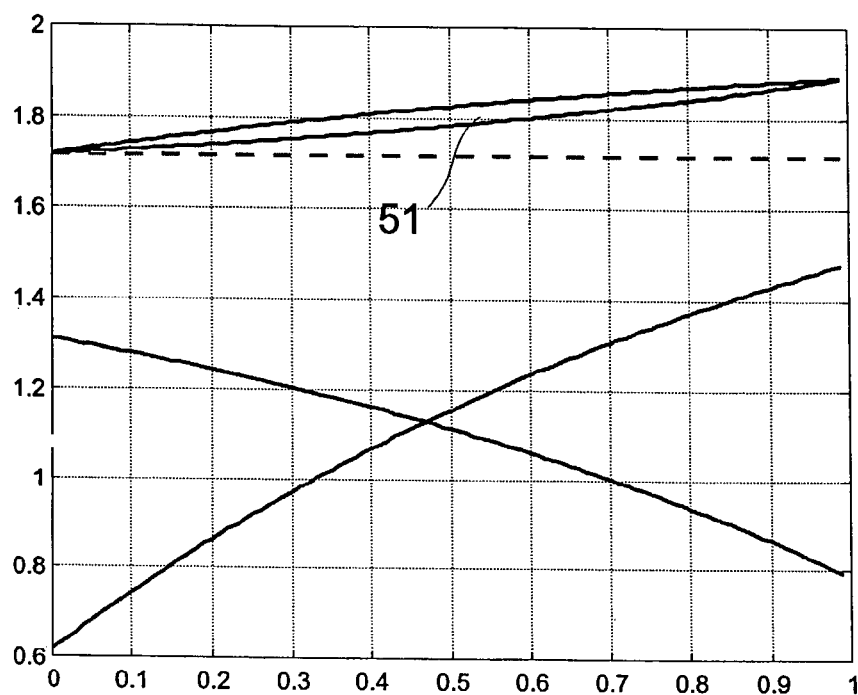
Figure 5:
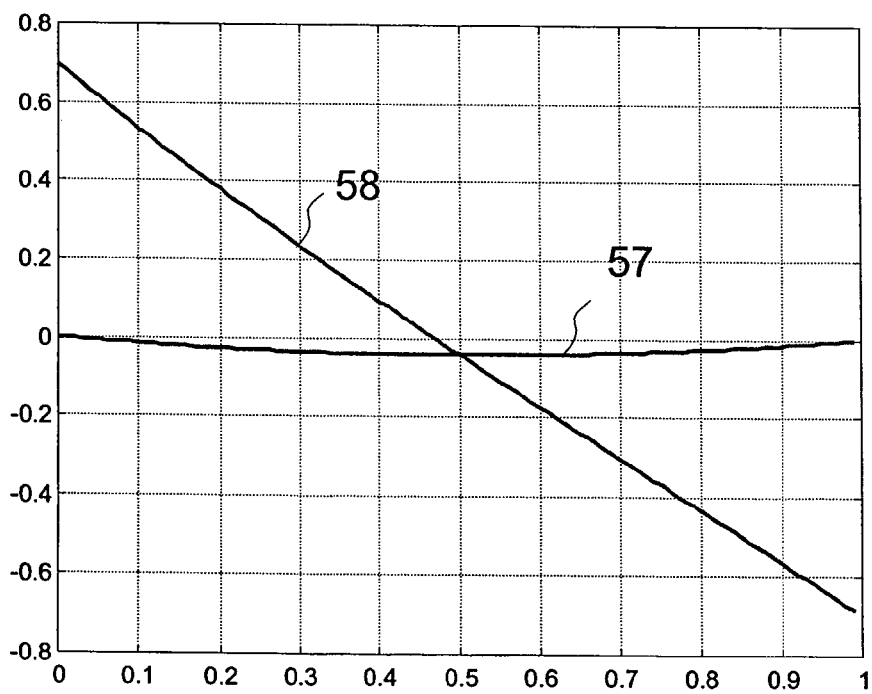
Figure 6:
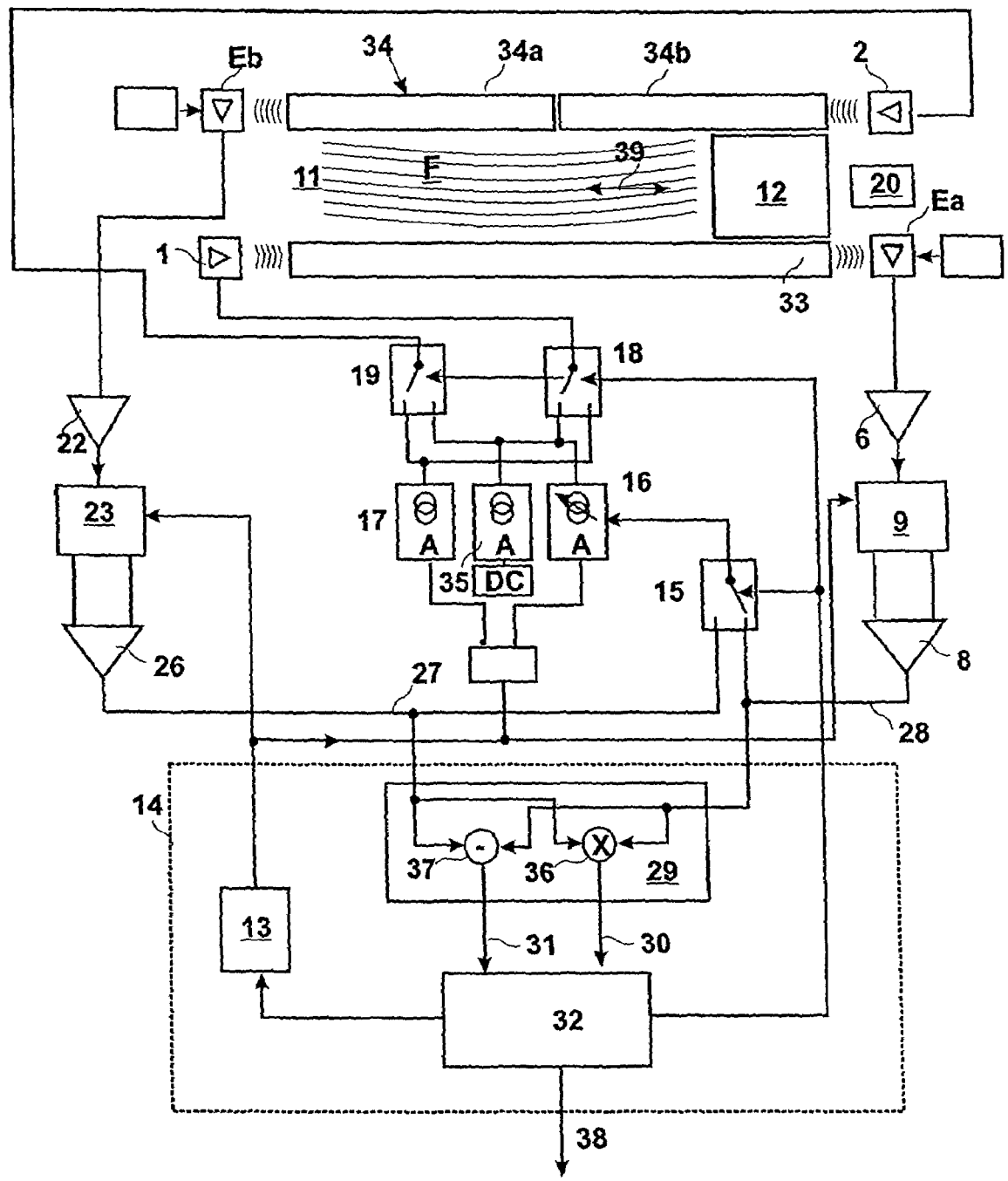
Figure 7:
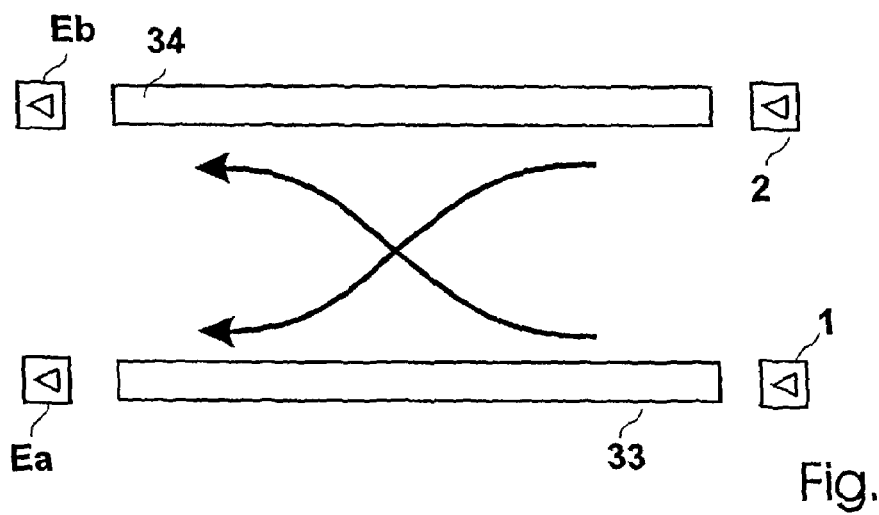
Figure 8:
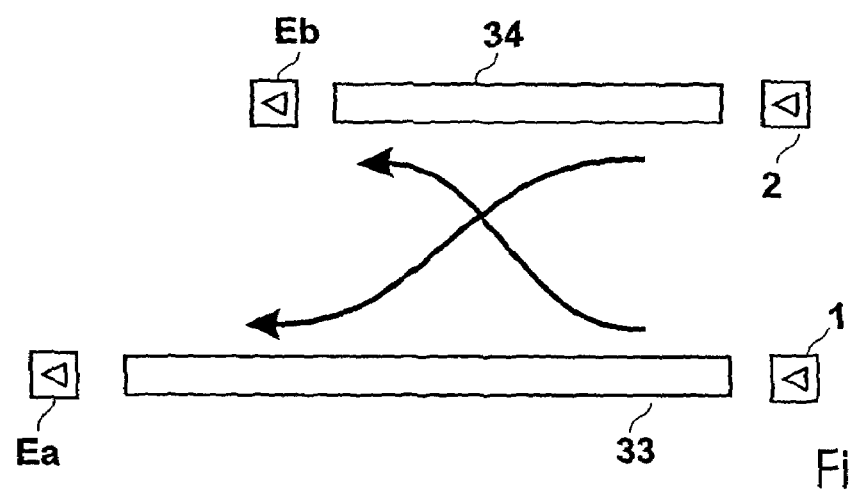
Figure 9:
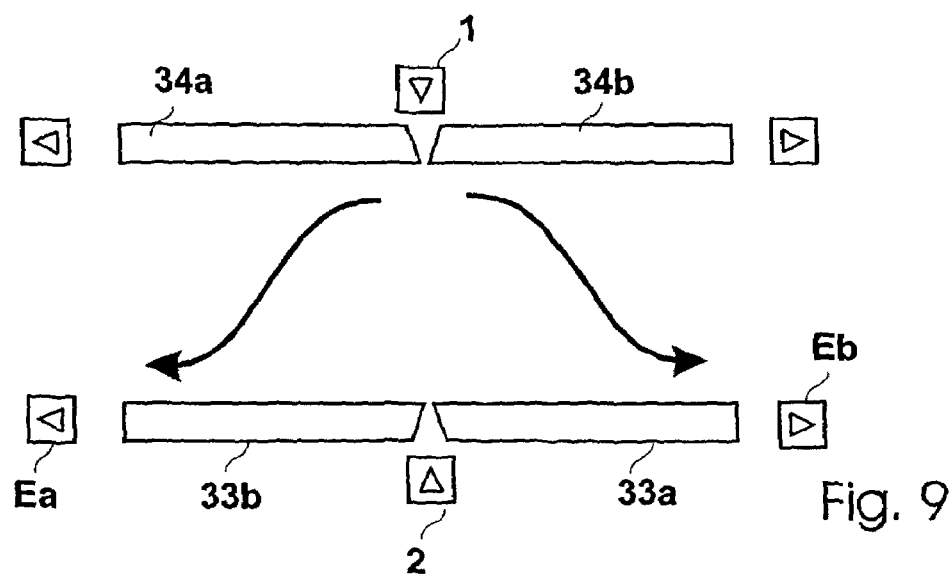
Figure 10:
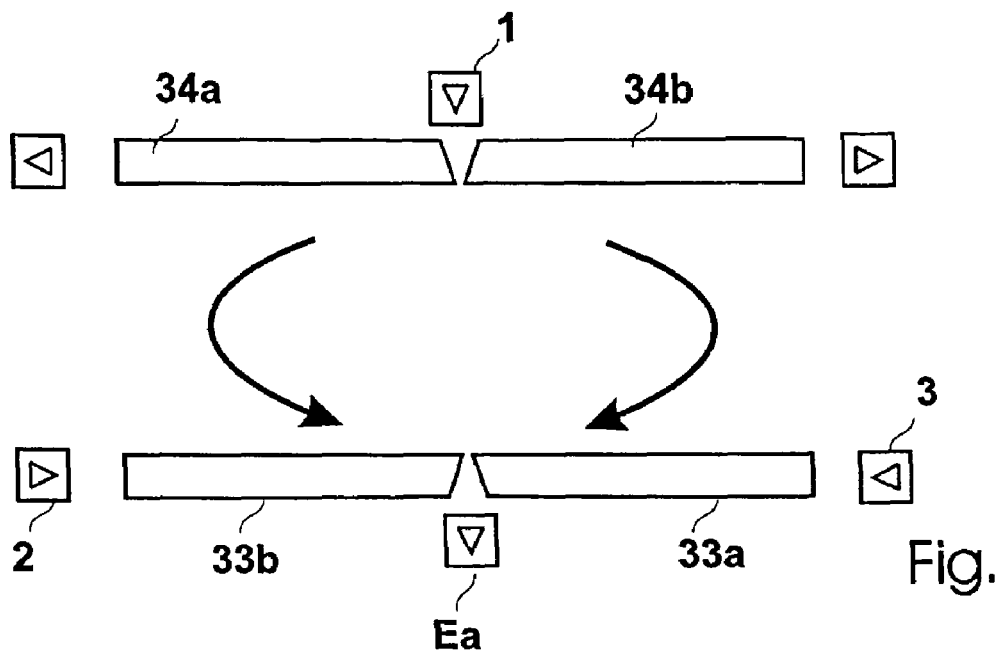
Figure 11:
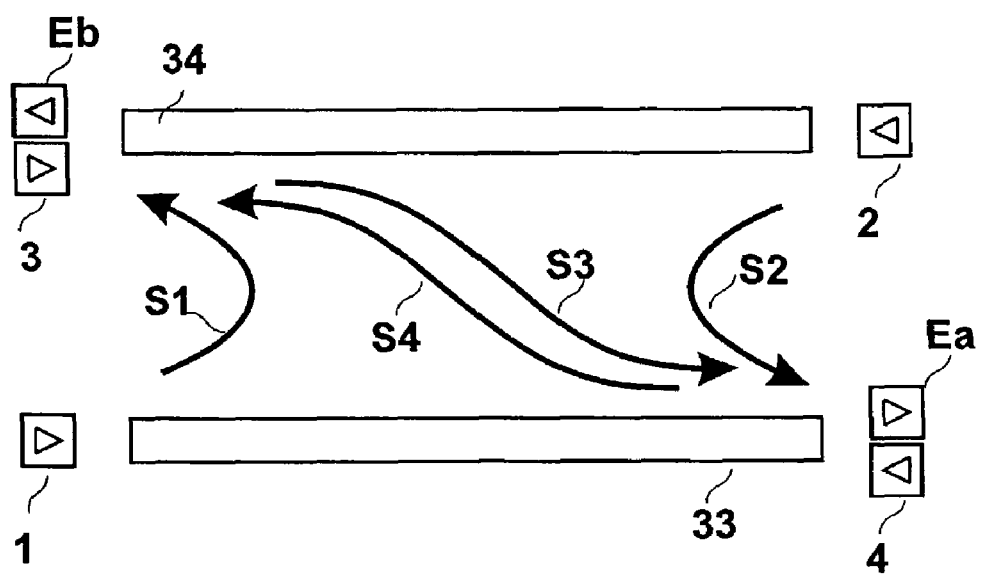
Figure 12:
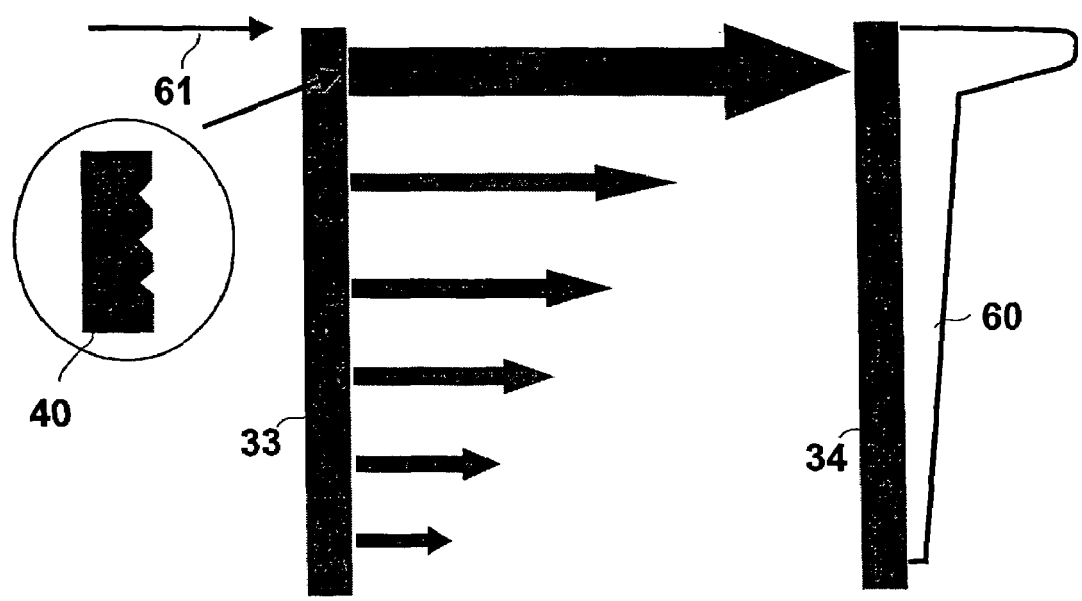
Figure 13:
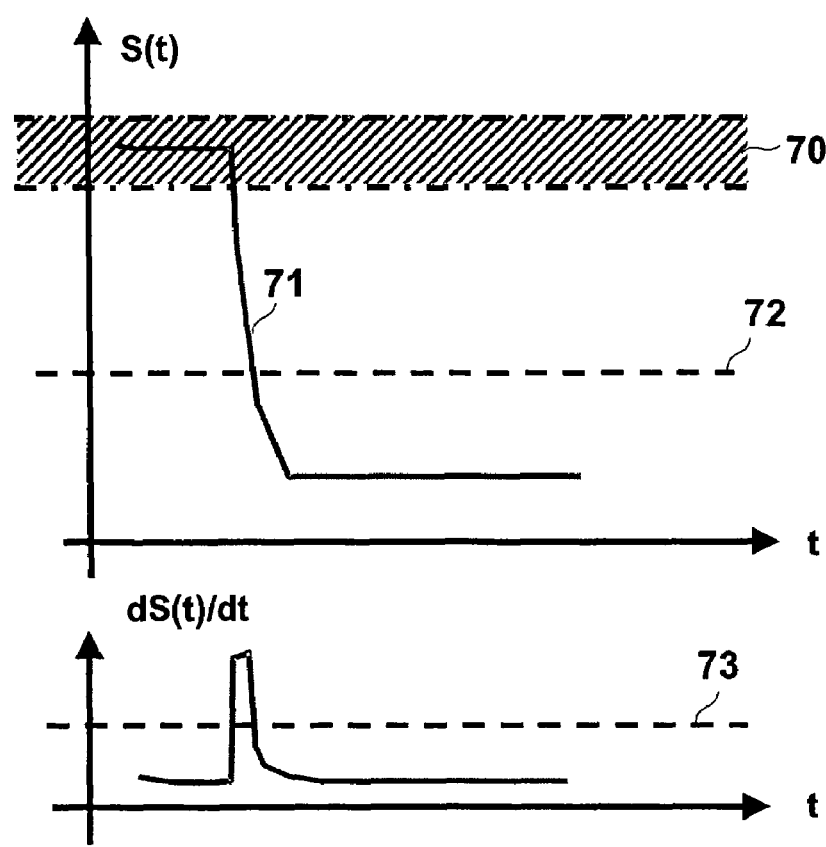

FIG. 3 shows a schematic view of bidirectional measurements with a view of the light flux of exponential characteristic of the light intensity, FIG. 4 shows the signal course with the sliding roof closing with an absorbing object superimposed in the light field, FIG. 5 shows object identification by evaluation of the signal difference, FIG. 6 shows an associated circuit, FIG. 7 to 10 show various alternative, schematically shown arrangements of a light source, receiver and compensation element, FIG. 11 shows an alternative schematically shown arrangement for multiple measurements, FIG. 12 shows a transmitting/receiving characteristic of the light intensity in the region of the closing edge, FIG. 13 shows the static and dynamic signal course at the closing edge in the presence of an object over the time.

DETAILED DESCRIPTION OF PREFERRED EMBODIMENTS

The invention will now be described in more detail by way of example with reference to the accompanying drawings. However, the embodiments are only examples which are not intended to limit the inventive concept to a specific arrangement.

The Figures show a device for identifying an object in or on a closable opening 11, in particular the opening of a vehicle. Basically, in a closable opening, it is to be identified whether an object O is located inside the opening, so a closing movement can optionally be discontinued. During this identification, on the one hand, short-term changes are to be identified, on the other hand, however, objects O that are located longer-term in the opening also have to be identified. Openings of this type may be doors, windows, or, on a vehicle, windows, a sliding roof or boot. While, in the case of, in particular, motor driven movable parts on the vehicle, such as the sliding roof or a window closer, mostly jamming and/or shearing movements of body types of the occupants are to be prevented, in the case of a boot lid it may merely be a case of ensuring that no objects are located in the region to be monitored. If, for example, in the case of a convertible vehicle top, the boot is automatically closed, no bottle or other item of luggage should project into the closure region. Basically, the device and the method can also be used outside the vehicle area, however.

Figure 1:
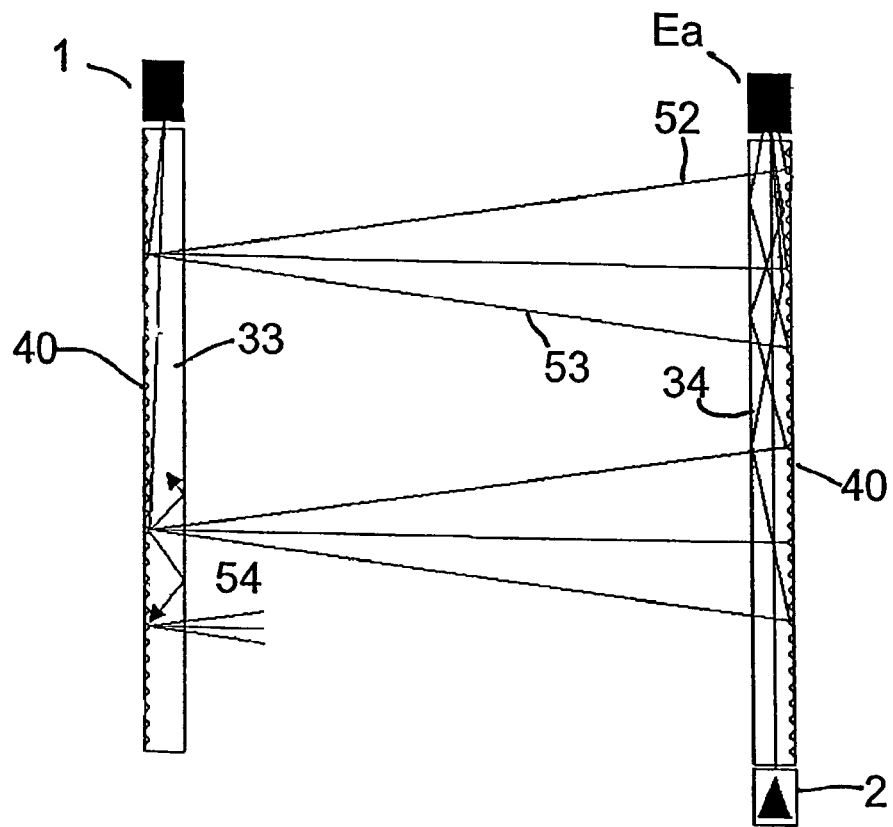
FIG. 1 shows the basic structure of a light field.

FIG. 1 shows the basic structure to generate a light field. By means of a light source 1, light is fed into a first light guide 33 and is deflected there on a structure 40 at an angle, which allows the light to be emitted transversely to the light guide. It has been found that an optimal narrow range is achieved in the case of a slightly angled arrangement is achieved according to the lines 52 and 53. For this purpose, the emitting first light guide 33 in FIG. 1 and the receiving second light guide 34 have a structure 40 of this type. Light can either impinge directly on this structure and be radiated or can further be deflected according to the light path 54 on the first structure at an angle such that it is relayed within the total reflection in the light guide and then, however, output at a further location of the structure. This is basically known from the earlier German patent application DE 10 2004 011 780.2.

Figure 2:
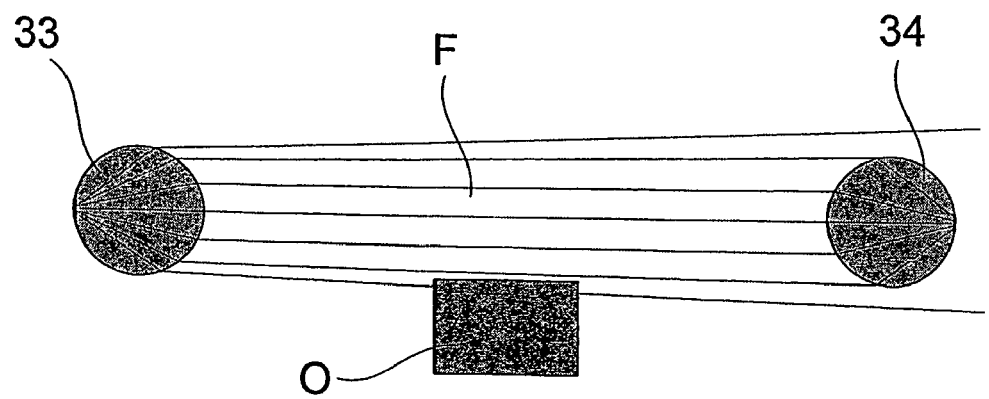
FIG. 2 shows the light field in side view.

The light received by the receiving second light guide is conducted to the receiver Ea. If, according to FIG. 2, an object O arrives in the light field F created in this manner, this leads to shadowing, which is perceived at the receiver Ea, Eb. According to FIGS. 3 and 6, at least one light source 1, 2, 3, 4 and at least one receiver Ea, Eb is preferably associated with each light guide, in each case. However, a receiver and light source do not have to be associated with each light guide, it is also sufficient to only provide some of the light guides accordingly with a receiver and light source. It is only necessary for corresponding transmission and, if necessary, compensation paths to be constructed in the light field F, which will be dealt with below. If the light guides consist of a plurality of segments, for example, a receiver or transmitter does not have to be associated with each segment. In this case, for example, a receiver or a light source can "service" a plurality of segments.

By means of a clock circuit 13, light is fed in an alternating manner into the light guides 33, 34 and is received by the respective receiver. Comparison means are provided, which compare the signals present at the receivers to identify the object O. At the bottom of FIG. 3, the light intensity is shown for the two views according to FIG. 3 at the top. The light flux is plotted on the ordinate, while the standardised light guide coordinate is plotted on the abscissa. Curve 55 shows the measurement of FIG. 3 at the top left, curve 56 the measurement of FIG. 3 at the top right. A symmetrical view is shown with the two values only being identical in the middle region, so that with difference formation, in the ideal case, a value of zero would emerge. The middle region is initially insignificant, however, for identifying an object. If it is intended to also include this region, additional measurements can be carried out by a division of the light guides into a plurality of parts or by additional light-emitting diodes and photodiodes at the ends of the light guides, in order to also cover this region by additional measured values.

Basically, the following problems are produced during the measurement:

If two light sources are used, for example in the form of LEDs, and a receiver according to the principle of EP 0 706 648 B1, the measuring method is insensitive with respect to temperature variations and non-linearities on the receiving side owing to strong extraneous light radiation in the receiving photodiode. On the transmission side, the degree of efficiency of the LEDs influences the measuring result. As the equations G1) and G2) show, the absolute value of the LED degree of efficiency is not entered, but only the ratio of the two values.

Measured signal of the receiver 1

$$U_1 = \frac{\eta_{L1}}{\eta_{L2}} K \frac{S_1}{S_{C2}} \quad \text{G1)}$$

Measured signal of the receiver 2

$$U_2 = \frac{\eta_{L2}}{\eta_{L1}} K \frac{S_2}{S_{C1}} \quad \text{G2)}$$

wherein:
$\eta_{L1}$=transmission function transmitter 1
$\eta_{L2}$=transmission function transmitter 2
$S_{C1}$=optical damping factor compensation path transmitter 1
$S_{C2}$=optical damping factor compensation path transmitter 2
$S_1$=optical damping factor transmission path transmitter 1
$S_2$=optical damping factor transmission path transmitter 2
K=system constant.

Transmission paths are, for example, the paths entered in FIGS. 7 to 11 along the arrows, while a compensation path is generally the path of the compensation element to the receiver generally in the light guide. If the light source 1 at the top left in FIG. 3 is the transmitter, the transmitting path runs to the receiver Ea via the light guides 33, 34 and the opening 11. The light source 2 at this moment is the compensation element, so the compensation path runs from the light source 2 to the receiver Ea through the light guide 34.

When the two light-emitting diodes are subjected to uniform temperature changes, the measured value is therefore not influenced. However, as, the light sources 1, 2 may have different temperatures owing to their large distance from one another, for example, in the application as a jamming protection, for example of a sliding roof, the measured value may be influenced by the temperature. This limits the absolute measuring precision of the system.

Therefore, a dynamic measuring method is used currently, the mode of functioning of which is based on detecting and evaluating rapid changes with time constants that are smaller than the time constants which are connected with temperature changes of the LEDs. If objects O are located for a relatively long time in the light field of the monitoring region, it is difficult, however, to decide with the aid of a dynamic measurement whether the objects O are still present or not after a relatively long time.

It is therefore desirable to carry out a static measurement with absolute precision and to suppress the temperature influence of the light sources in the measuring result. This may, for example, take place with the arrangement shown in FIG. 6. The method is based on carrying out two measurements with the different receiving elements Ea and Eb and using the same transmitting elements 1 and 2 during the two measurements. The two measuring phases are activated sequentially by the processing unit 14 (for example a microprocessor). For the first measurement, according to FIG. 3 at the top left, only the measured signal 28 is evaluated by the processing unit 14. The change-over switches 15, 18, 19 are located in the position shown in FIG. 6 for this measurement.

The current sources or modulators 17 and 16 are modulated via the central clock generator of the clock circuit 13, the phase displacement between the two modulators being 180 degrees. In the case of rectangular modulation signals, the light sources 1, 2 are thus switched on and off in an alternating manner and radiate their light into the light conductors 33, 34. The receiver amplifier 6 with an optionally upstream high pass filter amplifies the alternating component of the photoelectric current generated by the receiver Ea, for example a photodiode. In the synchronous demodulator 9, the amplified receiving signal is separated into the two components, which were generated by the light sources 1 and 2 and optionally switched via low pass filters. The comparator 8 evaluates the difference between the two receiving signals and controls the current intensity of the modulator 16 in such a way that the signal difference at the input of the comparator 8 becomes zero. The light source 1 is a compensation element at this moment. Alternatively, additional compensation elements may also be provided which do not depend on the light sources 1, 2, 3, 4. This manner of obtaining a measured signal of a single measurement corresponds to the prior art according to EP 0 706 648 B1.

The current source 35 applies to the light source 1, 2, in addition to the modulated current, an unmodulated direct current. It can thus be achieved that the compensation element is operated with the same current as the light source 2. This is advantageous in order to keep the degree of efficiency of the light sources constant between the two measurements.

The processing unit 14 stores the signal 28 in temporary storage. The second measurement now takes place according to FIG. 3, top right, in that the change-over switches 15, 18 and 19 are switched into the other position and the clock circuit 13 is activated. The light source 2 is adjusted by changing the current amplitude of the modulator 16 by the control loop consisting of the receiver Eb, the receiver amplifier 22 with an optionally upstream high pass filter, the synchronous demodulator 23, optionally present low pass filters, the comparator 26 and the modulator 16, 17 in such a way that the difference at the input of the comparator becomes zero. When that has happened, the signal 27 is stored by the processing unit 14.

The signals 27, 28 are multiplied by the arithmetic unit 29 by means of the multiplier 36. As can be seen from the system equation G3), this product is no longer dependent on the transmission function of the transmitters, and therefore, in particular, the temperature dependency of the transmitters or light sources 1, 2 is no longer significant in the measured signal.

$$U_1 * U_2 = K^2 \frac{S_1 S_2}{S_{C1} S_{C2}} \quad \text{G3)}$$

wherein:
$\eta_{L1}$=transmission function transmitter 1
$\eta_{L2}$=transmission function transmitter 2
$S_{C1}$=optical damping factor compensation path transmitter 1
$S_{C2}$=optical damping factor compensation path transmitter 2
$S_1$=optical damping factor transmission path transmitter 1
$S_2$=optical damping factor transmission path transmitter 2
K=system constant.

By comparing the product 30 with a static reference value, when the sliding roof closes, it can be identified whether an object O is located in the light field F. As the closing sliding roof amplifies the measured signal it may be sensible to store the reference value as a characteristic curve which is dependent on the sliding roof position. This reference value characteristic curve can be adapted to soiling and ageing influences by a learning run or adaptation method during operation. A static measurement is thus possible for whether an object is currently moving in the light field F. Instead of or in addition to the product, a division may also be carried out. The temperature dependency would also be eliminated thereby.

In addition, the difference 31 between the signals 27 and 28 is generated by the arithmetic unit 29. This makes it possible to suppress the interfering influence of the closing sliding roof on the measured signal. The difference is constant when the sliding roof is open and closed and corresponds to a reference value, which is ideally zero. While the sliding roof is closing, a deviation of the difference value occurs according to the curve 51 in FIG. 4, from the reference value. This deviation again reduces to zero, however, when the sliding roof has closed. If a light field F is generated with a light intensity decreasing along the light guide, an object O in the light field causes a deviation of the difference 31 from the reference value (FIGS. 4, 5). This deviation is all the greater the closer the object is located to the closing edge 61 of the sliding roof. Thus it can be identified with the aid of the trend of the difference 31 whether an object O is located in the sliding roof cutout when the sliding roof is closing, even when this object has been there for a relatively long time (static measurement). If the light intensity in the region of the closing edge according to FIG. 12 increases, the detection sensitivity increases; the difference 31 is increased in the region of the closing edge 61 with the same object size, and thus smaller objects can also be identified. This produces the transmission/reception characteristic 60 shown in FIG. 12. For this purpose, the structure 40 at this location can be correspondingly configured for corresponding configuration of a non-linear light gradient along the light guide. This static measurement only requires one calibrating value, namely the difference 31 without the object. This produces a substantially lower outlay for calibration compared to individual measurement or else product evaluation.

The static measurement during closing of the movable element 12 can advantageously be switched off in favour of dynamic measurement, as in this case it is ensured by the static measurement which is carried out until then, optionally in an alternating manner with the dynamic measurement, that no object is located in the light field F. Nevertheless, a static measurement, is basically also always possible, but optionally with an increased calibration outlay owing to the movement of the movable element 12, in other words, for example, the sliding roof.

FIG. 13 shows the signal course 71 at the closing edge 61 in the presence of an object over the time. Without an object, the tolerance range 70 exists. With the presence of an object, the signal changes until a static threshold 72 is exceeded. The dynamic measurement in the image at the bottom also leads to a signal, as soon as the dynamic threshold 73 is exceeded.

The difference 31 is not temperature-compensated. The temperature of the light sources 1, 2 may be measured, however, via their forward voltage while being supplied with current. While the forward voltage is kept constant by adaptation of the maximum transmitting current amplitude, the temperature influence of the transmitting diodes on the measured signal can also be compensated.

Basically, a plurality of light guides 34a, 34b can be provided along at least one side of the opening. The light guides 33, 34 are arranged along the movement direction 39 of the movable part 12 and/or mirror-symmetrically to one another. If it is desired to achieve a uniform light propagation, the structure 40 of the light guides can be provided in an augmented and/or cumulative manner with increasing distance from the transmitting element. The structure 40 is preferably configured in such a way that the light intensity increases in the region in which the movable part 12 is located at the end of its closing movement. A motor drive 20 for the movable part 12 can be activated via the signal 38.

A compensation element for extraneous light compensation by control of the light intensity radiated into the measuring arrangement by at least one light source may be associated with the light guide 33, 34, so the clock-synchronous alternating light component which occurs between different phases of the light sources, becomes zero. The light sources are clocked here in a time-sequential manner and emit the light phase-wise. The compensation element can be the light source 1, 2, 3, 4 associated with the receiving light guide. The light source and receiver are connected to a control, with which the light signal of the light-emitting diodes used as a light source are compensated with a further modulated light signal in such a way that a constant light signal is substantially present at the receiver. In this case, the temporal average value of the current, which is required to generate the further modulated light signal and/or the temporal average value of the current, which is supplied to the at least one light-emitting diode can be adjusted in such a way that they substantially correspond to one another.

The device is preferably associated with a vehicle sliding roof, a window closer, a blind or part of a boot monitoring system. For ambient lighting, for example to emphasise the sliding roof by means of a light ring, the optic-fibre light guides 33, 34 may be at least partially transparent and the light may have a wavelength in a range which is visible to the human eye. The clock frequency is generally a frequency which is not perceivable to the human eye. Alternatively, the light guide may also be used, optionally via a further light source, as additional lighting and be dimmed for emphasis, for example. This does not disrupt its use as jamming protection or an object identification means, in particular when extraneous light compensation takes place at the same time as the light of the further light source is then also compensated during the signal evaluation.

According to the method, to detect static changes, the signals present at the receivers are multiplied by one another by means of a multiplier 36 or alternatively divided by one another. The value thus obtained is compared with a reference value, as is produced, in particular from the curve 51. The reference value is preferably a characteristic curve set up via the movement path of the movable part 12, which is dependent upon the position of the movable part. It is shown in FIG. 4 that, when an object O is present, a deviation occurs which is not influenced by the sliding roof. When a difference value is generated, an object O which has also been located for a relatively long time in the opening is also identifiable. FIG. 5, in particular, shows difference signals, with curve 57 showing the difference signal on the basis of the reflection of the sliding roof and curve 58 the difference signal on the basis of an absorbing object which is moving in the light field and is located in front of the edge of the closing sliding roof, in the light field superimposed with the influence of the sliding roof.

FIGS. 7 to 10 show various arrangements of the light sources 1, 2, by way of example, as transmitter and compensation element and the receiver. While in FIG. 6, the light sources as the transmitter and compensation element and also the two receivers are arranged diagonally opposite with respect to the opening, in FIG. 7 the receivers are on one end on the two sides of the opening and the two light sources on the other end. In this case, any desired arrangement of the light guides at the edges of the opening is possible and, according to FIG. 8, the light guides do not have to be the same length either.

In FIG. 9, the light sources, as transmitter and compensation element, are at a location along the light guides 33a, 33b or 34a, 34b or at their transition region, corresponding input locations in the form of bevels being provided. The receivers are arranged at the end of the light guides 33a, 33b. Further receivers can also be provided at the other light guide 34a, 34b. The arrangement of the compensation elements and receivers is transposed in FIG. 10 compared to FIG. 9, so the receiver Ea is arranged centrally between the light guides 33a and 33b and further light sources 2, 3 are arranged at their ends. If necessary, further light sources or receivers can also be provided here. In this case, it becomes clear that a light source or a receiver in an arrangement of this type can simultaneously be associated with a plurality of light guides. FIGS. 7 to 10 show only some possible arrangements, but the person skilled in the art can discover further suitable arrangements, as long as various measurements are possible over the opening.

Even the smallest signals can still be clearly detected owing to the extraneous light compensation known from EP 0 706 648 B1. Precipitation in the light field can also be sensed thereby, so a closing function can be introduced as a result of the precipitation. The receiver can also perceive strong insolation in the region of the light field and thereupon initiate automatic closure of the movable part 12. Light information about movements in the interior of a vehicle and/or on the windows of a vehicle can be identified by means of the light guides and the associated receivers Ea, Eb, so monitoring can simultaneously be carried out with the device.

The system is simultaneously very largely resistant to environmental influences such as temperature, extraneous light, smoke, dust, fog, reflections, scratches on the light guide. System-dependent ageing of the part components or soiling in the region of the light guides can optionally be counteracted by cyclic adaptation processes. Reflections, for example owing to the closing roof or the blind can be compensated via a learning run or adaptation method.

Owing to the sensitivity of the system, the legal requirements can be satisfied, in particular for the application purpose in the sliding roof, even if these system reaction times are such that, in the worst case conditions, no jamming forces of >100 N are reached with a spring rate of $\geq 10$ N/mm or $\leq 65$ N/mm in the opening region of 4 to 200 mm. The system reaction time is therefore produced from the requirement to reliably identify a jamming with a spring rate of 65 N/mm, wherein it must not exceed the maximally occurring jamming force 100 N. This has corresponding consequences for the design of the system, in particular with regard to the signal processing.

With regard to the system flexibility, system-relevant, vehicle-specific data, such as light field geometries, roof cover etc. can be parameterised via an interface. Further parameters may be characteristic maps for the vehicle speed, characteristic maps for the external temperature, characteristics maps for the triggering threshold (the system reaction time can thus be influenced, and thus the required jamming protection quality) and characteristic maps for detection as a function of the blind or roof position. The robustness of the system can thus be increased.

The measuring precision can be increased by further measurements, in that, for example, either the light guides are divided into a plurality of light guides, or receivers and transmitters are provided at their two ends. As a result of this alone, for example, according to FIG. 11 a number of eight measurements can be achieved with the bidirectional light field in order to solve the resulting equation system. In this case, two light sources 1, 2 are arranged on one end of the light guides, while at the respective other end of the light guides, a receiver Ea, Eb and a light source 3 or 4, in each case, are provided. If necessary, a further receiver could also be associated with the light sources 1 and 2, in order to increase the number of possible measurements.

In this case, the following eight fundamental equations are produced:

Measured signals of the first receiver Eb $$U_{1a} = \frac{\eta_{L1}}{\eta_{L2}} K \frac{S_1}{S_{C2}} \qquad (G4)$$

$$U_{1b} = \frac{\eta_{L1}}{\eta_{L3}} K \frac{S_1}{S_{C3}} \qquad (G5)$$

$$U_{1c} = \frac{\eta_{L4}}{\eta_{L2}} K \frac{S_4}{S_{C2}} \qquad (G6)$$

$$U_{1d} = \frac{\eta_{L4}}{\eta_{L3}} K \frac{S_4}{S_{C3}} \qquad (G7)$$

Measured signals of the second receiver Ea $$U_{2a} = \frac{\eta_{L2}}{\eta_{L1}} K \frac{S_2}{S_{C1}} \qquad (G8)$$

$$U_{2b} = \frac{\eta_{L2}}{\eta_{L4}} K \frac{S_2}{S_{C4}} \qquad (G9)$$

$$U_{2c} = \frac{\eta_{L3}}{\eta_{L1}} K \frac{S_3}{S_{C1}} \qquad (G10)$$

$$U_{2d} = \frac{\eta_{L3}}{\eta_{L4}} K \frac{S_3}{S_{C4}} \qquad (G11)$$

wherein:
$\eta_{L1}$=transmission function transmitter 1
$\eta_{L2}$=transmission function transmitter 2
$\eta_{L3}$=transmission function transmitter 3
$\eta_{L4}$=transmission function transmitter 4
$S_{C1}$=optical damping factor compensation path transmitter 1
$S_{C2}$=optical damping factor compensation path transmitter 2
$S_{C3}$=optical damping factor compensation path transmitter 3
$S_{C4}$=optical damping factor compensation path transmitter 4
$S_1$=optical damping factor transmission path transmitter 1
$S_2$=optical damping factor transmission path transmitter 2
$S_3$=optical damping factor transmission path transmitter 3
$S_4$=optical damping factor transmission path transmitter 4
K=system constant The following combinations of the fundamental equations G4 to G11 are independent of the degree of efficiency of the transmitters, so the temperature dependency of the transmitting elements is again compensated in the measurements:

$$U_{1b} * U_{2c} = K^2 \frac{S_1 S_3}{S_{C1} S_{C3}} \qquad (G12)$$

$$U_{1c} * U_{2b} = K^2 \frac{S_4 S_2}{S_{C4} S_{C2}} \qquad (G13)$$

$$U_{1a} * U_{2a} = K^2 \frac{S_1 S_2}{S_{C1} S_{C2}} \qquad (G14)$$

$$U_{1d} * U_{2d} = K^2 \frac{S_3 S_4}{S_{C3} S_{C4}} \qquad (G15)$$

The measuring sequence is as follows here:
1) Generation of the signal $U_{1a}$:

The light of the light source 1 and the light of the light source 2 are received via the receiver Eb. The receiving signal, which generates the light source 1 in the receiver Eb, is compared with the receiving signal, which the light source 2 produces in Eb. By means of output control of the light source 2, the light output is adjusted such that the same signal is received at the receiver E1 from the two light sources 1 and 2. The measuring signal $U_{1a}$ is proportional to the transmission output of the light source 2.

The other measured signals are obtained in an analogous manner, with four measurements being produced for each receiving element from the combination of the two transmitting elements or light sources 1, 2, 3, 4 on the transmitting light guide side and the two transmitting elements or light sources 1, 2, 3, 4 on the receiving light guide side. The light source, which is controlled with respect to its light output, will hereinafter be called the compensation element.

2) Generation of the signal $U_{1b}$:
    Light source 1: transmitting element
    Light source 3: compensation element
    Eb: receiver
3) Generation of the signal $U_{1c}$:
    Light source 4: transmitting element
    Light source 2: compensation element
    Eb: receiver
4) Generation of the signal $U_{1d}$:
    Light source 4: transmitting element
    Light source 3: compensation element
    Eb: receiver
5) Generation of the signal $U_{2a}$:
    Light source 2: transmitting element
    Light source 1: compensation element
    Ea: receiver
6) Generation of the signal $U_{2b}$:
    Light source 2: transmitting element
    Light source 4: compensation element
    Ea: receiver
7) Generation of the signal $U_{2c}$:
    Light source 3: transmitting element
    Light source 1: compensation element
    Ea: receiver
8) Generation of the signal $U_{2d}$:
    Light source 3: transmitting element
    Light source 4: compensation element
    Ea: receiver The products $U_{1b}*U_{2c}$, $U_{1c}*U_{2b}$, $U_{1a}*U_{2a}$ and $U_{1d}*U_{2d}$ no longer contain any dependency on the transmission functions $\eta_{L1}$, $\eta_{L2}$, $\eta_{L3}$, $\eta_{L4}$ of the transmitting elements, resulting, in particular, in a temperature influence owing to a temperature difference between the transmitting element and compensation element being eliminated.

It is obvious that this description can be subjected to the most varied modifications, changes and adaptations which vary in the range of equivalents to the annexed claims.

LIST OF REFERENCE NUMERALS

1, 2, 3, 4 light source
6, 22 receiver amplifier
8, 26 comparator
9, 23 synchronous demodulator
11 opening
12 movable part
13 clock circuit
14 processing unit 15, 18, 19 change-over switch
16, 17 modulator
20 motor drive
27, 28 signal
29 arithmetic unit
30 product
31 difference
32 control unit
33 first light guide
34 further light guide
34a, 34b plurality of light guides
35 current source
36 multiplier
37 difference generator
38 control signal
39 movement direction
40 structure
51, 52, 53 curve
54 light path
55 . . . 58 curve
60 transmitting/receiving characteristic
61 closing edge
70 tolerance band without object
71 signal characteristic curve over the time
72 static threshold
73 dynamic threshold
Ea, Eb receiver
F light field
O object

The invention claimed is:

1. A device for identifying an object in or on a closable opening, comprising a device for opening and closing the opening by means of a movable part and an optoelectronic detection mechanism for identifying the object, which feeds light into at least one first light guide and at least one second light guide by means of at least one light source and detects changes in the received light by means of at least one receiver,
wherein each of the first light guide and the second light guide has a means for emitting light transversely to its longitudinal extent and a means for receiving light transversely to its longitudinal extent, while being in operative connection with the at least one receiver,
wherein the first and second light guides are arranged at the edge of the opening in such a way that a bidirectional light field is produced between them which at least partially bridges the opening,
wherein a clock circuit is provided, which feeds light in an alternating manner into the first and second light guides, which light is received by the at least one receiver, and
wherein a comparison means is provided for comparing the signals present at the at least one receiver to identify the object.

2. The device according to claim 1, wherein the opening is an opening of a vehicle.

3. The device according to claim 1, wherein a multiplier or a divider is provided for temperature compensation, which multiplies or divides the signals present at the at least one receiver by one another to identify changes, and wherein a control unit compares the product or the division result with a reference value.

4. The device according to claim 3, wherein the reference value is a characteristic curve which is set up by means of a movement path of the movable part, and depends on a position of the movable part.

5. The device according to of claim 1, wherein a difference generator is provided for identifying an object located in the bidirectional light field and generates a difference from the signals present at the at least one receiver.

6. The device according to claim 1, wherein the first and second light guides are provided on opposing sides of the opening.

7. The device according to claim 1, wherein a plurality of first or second light guides are provided along a side of the opening.

8. The device according to claim 1, wherein the first and second light guides are arranged along a movement direction of the movable part and/or mirror-symmetrically.

9. The device according to claim 1, wherein the first and second light guides each have a structure for radiating out or receiving the light transversely to their longitudinal direction.

10. The device according to claim 9, wherein the structure is provided in an augmented and/or cumulative manner, with increasing distance from the light source.

11. The device according to claim 9, wherein the structure is configured such that it increases the light intensity in a region in which the movable part is located at the end of its closing movement.

12. The device according to claim 1, wherein a motor drive is provided to move the movable part, which motor drive is activated as a result of the signals present at the at least one receiver.

13. The device according to claim 1, wherein a measuring arrangement comprising the first and second light guides, the at least one light source, and the at least one receiver is provided, and wherein a compensation element for extraneous light compensation by control of the light intensity radiated into the measuring arrangement by the at least one light source is associated with the first and second light guides, so that a clocked alternating light component, which occurs between different phases of the light alternately emitted into the opening by the first and second light guides, becomes zero, wherein the at least one light source emits light in a phase-wise manner and clocked in a time-sequential manner.

14. The device according to claim 13, wherein the compensation element is the light source associated with the receiving one of the first and second light guides.

15. The device according to claim 1, wherein the at least one light source and the at least one receiver are connected to a control, with which the light signal of a light-emitting diode used as the light source is compensated with a further modulated light signal in such a way that a constant light signal is substantially present at the receiver, wherein the temporal average of the current, which is required to generate the further modulated light signal, and/or the temporal average of the current which is supplied to the light-emitting diode, substantially correspond to one another.

16. The device according to claim 1, wherein the device is associated with a sliding vehicle roof or a window closer or a blind or is part of a boot monitoring system.

17. A method for identifying an object in or on an opening which can be closed by means of a movable part, comprising the steps of:
arranging a plurality of light guides along the opening including at least one first and at least one second light guide, wherein each of the first light guide and the second light guide has a means for emitting light transversely to its longitudinal extent and a means for receiving light transversely to its longitudinal extent;

emitting light in an alternating manner from the at least one first light guide transversely to its longitudinal extent and then the at least one second light guide transversely to its longitudinal extent to form a bidirectional light field at least partially bridging the opening;

receiving light emitted from one light guide by means of at least one receiver that is in operative connection with the other light guide; and comparing the signals present at the at least one receiver to identify the object.

18. The method according to claim 17, characterized in that, to identify changes, the signals present at the receiver are multiplied by one another or divided and are compared with a reference value.

19. The method according to claim 18, wherein a characteristic curve set up by means of a movement path of the movable part is stored as the reference value and is dependent on the position of the movable part.

20. The method according to claim 17, wherein a difference is generated from the signals present at the receiver to identify an object located statically in the light field.

21. The method according to claim 17, wherein the light intensity of the light emitted from the light guides is increased in the region in which the movable part is located at the end of its closing movement.

22. The method according to claim 17, wherein the opening with the movable part is closed by a motor drive, which is activated as a result of the signals present at the receiver.

23. The method according to claim 17, wherein the object is a precipitation, and the opening is closed on identification of the precipitation.

24. The method according to claim 17, wherein the light guides are partially transparent, and light is radiated into the light guides in a wavelength range which is visible to the human eye and preferably at a frequency which is not perceivable to the human eye.

25. The method according to claim 17, wherein the receiver senses strong insolation in the region of the light field, and thereupon initiates automatic closing of the movable part.

26. The method according to claim 17, wherein the movable part is a vehicle part.

27. The method according to claim 17, wherein incident light in the second light guide contains light information about movements in an interior of a vehicle and/or at the windows of the vehicle, which information can be evaluated by an evaluation unit.

28. The method according to claim 17, wherein the light signal of one light-emitting diode used as the light source is compensated with a further modulated light signal in such a way that substantially a constant light signal is present at the receiver, wherein the temporal average of the current, which is required to generate the further modulated light signal, and/or the temporal average of the current which is supplied to the light-emitting diode, is changed in such a way that the temporal averages substantially correspond.

* * * * *

UNITED STATES PATENT AND TRADEMARK OFFICE
CERTIFICATE OF CORRECTION

PATENT NO. : 7,378,641 B2  
APPLICATION NO. : 11/568239  
DATED : May 27, 2008  
INVENTOR(S) : Melcher et al.

Page 1 of 1

It is certified that error appears in the above-identified patent and that said Letters Patent is hereby corrected as shown below:

IN THE CLAIMS:

Claim 5, col. 14, line 1: delete the word "of"

Signed and Sealed this

Twenty-ninth Day of July, 2008

JON W. DUDAS  
*Director of the United States Patent and Trademark Office*